United States Patent [19]
Blevins

[11] Patent Number: 6,056,411
[45] Date of Patent: May 2, 2000

[54] REALIGNMENT DEVICE FOR VEHICLE SIDE MIRROR

[76] Inventor: Jeffrey A. Blevins, 1293 Road 117, Glenwood Springs, Colo. 81601

[21] Appl. No.: 08/882,187

[22] Filed: Jun. 25, 1997

[51] Int. Cl.[7] .................................................. G02B 5/08
[52] U.S. Cl. .............................................. 359/838; 359/871
[58] Field of Search .................................. 359/838, 871; 340/384.1, 384.2; 116/22 A, 24; 119/719

[56] References Cited

U.S. PATENT DOCUMENTS

| | | | |
|---|---|---|---|
| 2,360,368 | 10/1944 | Rubissow | 33/264 |
| 4,257,706 | 3/1981 | Smith | 33/264 |
| 4,730,926 | 3/1988 | Wedemeyer | 33/264 |
| 4,971,430 | 11/1990 | Lynas | 359/877 |
| 5,122,910 | 6/1992 | Polanyi et al. | 359/865 |
| 5,224,270 | 7/1993 | Burrus | 33/264 |
| 5,237,458 | 8/1993 | Polanyi et al. | 359/839 |
| 5,500,773 | 3/1996 | Easter | 359/838 |

*Primary Examiner*—Cassandra Spyrou
*Assistant Examiner*—Euncha Cherry
*Attorney, Agent, or Firm*—John L. Isaac; Isaac & Associates

[57] ABSTRACT

A device is provided for use in aligning an exterior mirror of a vehicle to a preestablished position. The device includes an alignment sight securable relative to the mirror to selectively target a fixed member of the vehicle. A mechanism attaches the alignment sight to the mirror, and a device is provided for pivoting the alignment sight in its attached position relative to the mirror in at least two planes. Finally, a mechanism is provided for selectively fixing the pivotal position of the alignment sight relative to the mirror upon targeting the sight to a fixed vehicle member when the mirror is in its preselected position. In one embodiment of the present invention, the alignment sight is adapted to also form a whistle designed to emit sounds at wavelengths audible to animals as air passes therethrough.

22 Claims, 6 Drawing Sheets

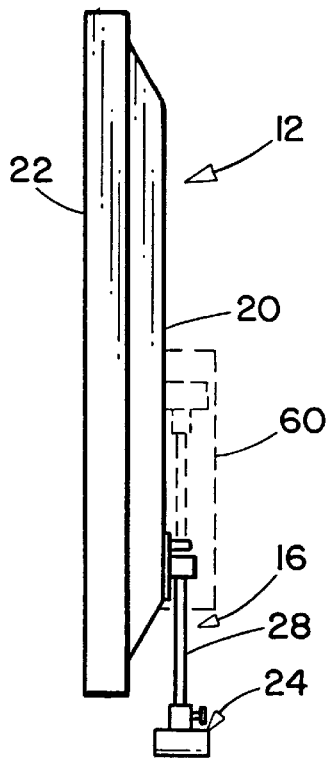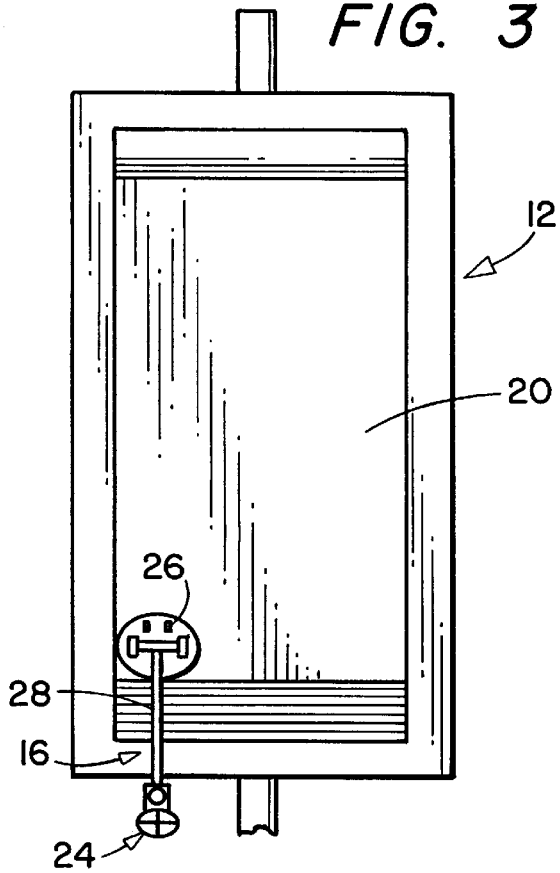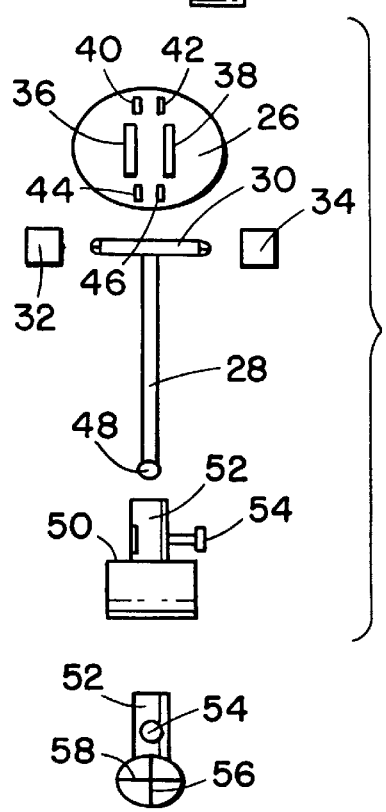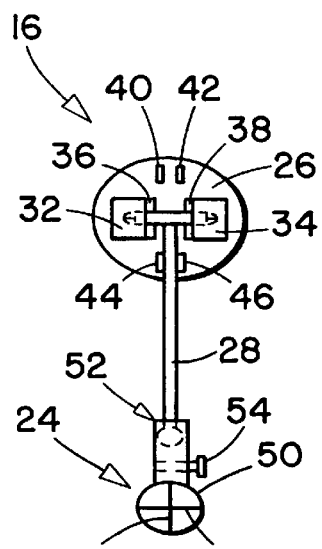

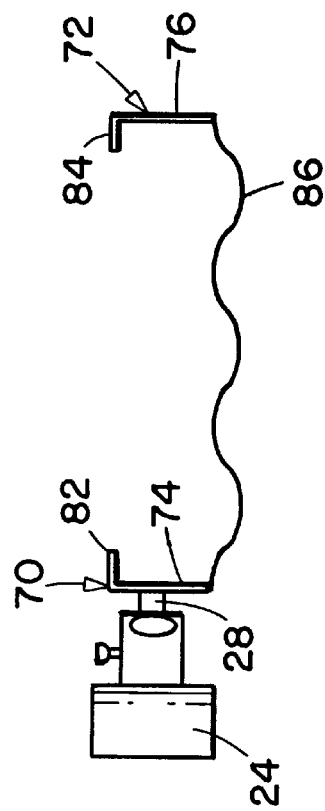
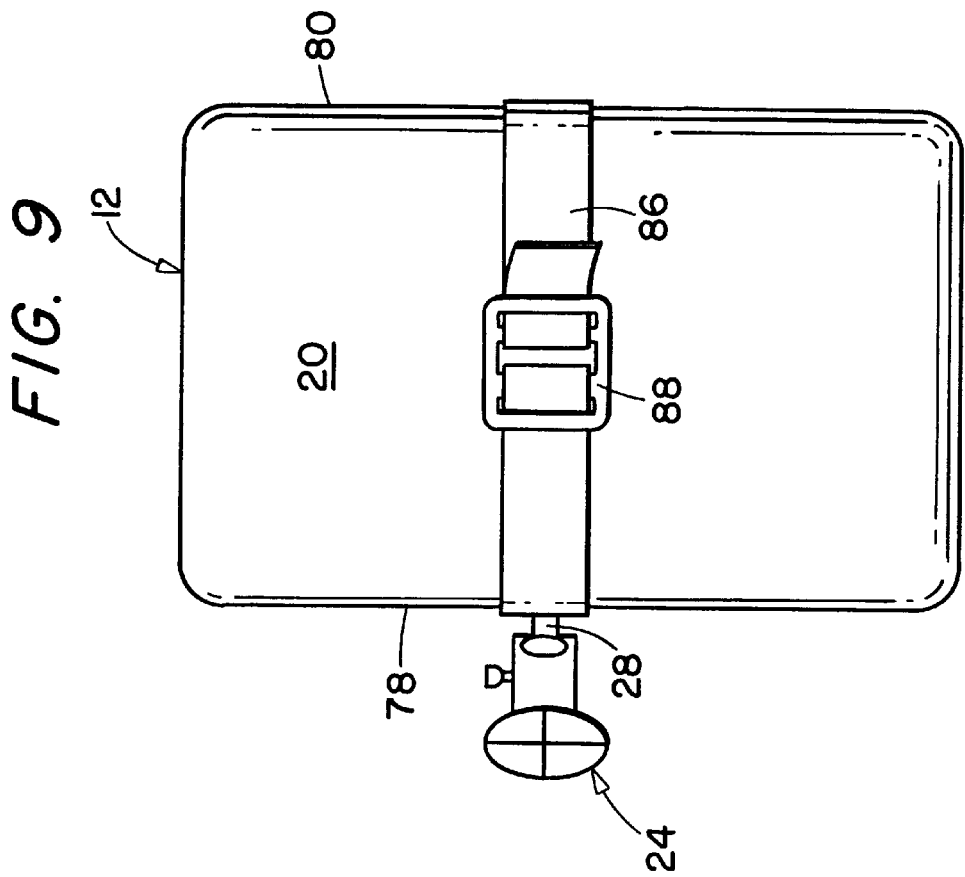

REALIGNMENT DEVICE FOR VEHICLE SIDE MIRROR

BACKGROUND OF THE INVENTION

1. Field of the Invention

The present invention relates generally to motor vehicle mirrors and, more particularly, to mechanisms for adjusting them. Specifically, the present invention relates to mechanisms which assist in aligning external vehicle mirrors.

2. Description of the Prior Art

Motor vehicles commonly have exterior mirrors mounted on each side to provide the operator of the vehicle with views both to the rear and sides of the vehicle not otherwise readily within the field of vision. Automobiles and trucks typically have two external mirrors, one on the driver's side and a more remote mirror on the passenger side. These mirrors are usually adjustable since the desired setting of a mirror is determined by the size, needs and preferences of a particular vehicle operator. Such mirrors frequently require realignment because they are accidentally knocked or jarred out of the desired setting, or because of the vehicle is operated by more than one individual thereby requiring different settings.

The driver's side mirror is commonly within easy reach from the driver's seat and so is susceptible to quick, unaided adjustment by a driver remaining in the driver's seat during such adjustment. While the adjustment and realignment of the driver's side external mirror may require several attempts, as well as reaching out to the exterior of the vehicle from the driver's seating position, this adjustment can nonetheless be readily made. However, the passenger side mirror is usually more remote and out of easy reach of a person sitting in the driver's seat. Thus, it is difficult if not impossible for one person to view the driver's perspective on the passenger's side mirror while simultaneously twisting the remote passenger side mirror into a desired setting. As a consequence, realigning the passenger side mirror requires the cooperation of two people or, if only a single driver is available, a series of time consuming trial and error adjustments. The adjustments require either moving back and forth between the views from the driver's seat and the passenger's seat from within the vehicle, or getting out of the vehicle to the exterior mirror, making the adjustment, returning to the driver's seat, and then repeating the same sequence of steps several times to achieve the desired adjustment.

As a consequence of the difficulty and inconvenience of such trial and error adjustments for the passenger side external mirror, a number of devices have been created in an attempt to eliminate such difficulty and inconvenience. U.S. Pat. No. 4,971,430 discloses a remote control mirror targeting and repositioning system. Such remote control systems, however, can be expensive and must be incorporated as part of the originally built vehicle rather than added on after the vehicle has been built. Various targeting systems are disclosed in U.S. Pat. Nos. 2,360,368, 4,257,706 and 5,224,270 for utilizing rearview mirrors more effectively. However, these particular references do not disclose any device intended to obviate the problems disclosed and discussed above.

U.S. Pat. Nos. 4,730,926, 5,122,910, 5,237,458 and 5,500,773 all disclose devices that are intended to be utilized in conjunction with the side mirror for targeting fixed portions of the vehicle for purposes of adjusting and realigning the mirror. However, all of these devices require at a 3-way reflector system in order to accomplish the goal of assisting in realigning the external mirror once it has been knocked or jarred out of its original desired setting. Such 3-way auxiliary mirror systems are more complicated than necessary in order to accomplish the desired purposes, thus increasing cost, increasing complexity of use, and increasing potential of misalignment. Therefore, there is still a need for a simple device which can be either incorporated as part of the original vehicle or added as an after-market device which is designed for assisting in easy realignment of exterior vehicle mirrors.

SUMMARY OF THE INVENTION

Accordingly, one object of the present invention is to provide a device to assist in realigning external vehicle mirrors.

It is another object of the present invention to provide an external mirror targeting system for assisting in realigning the mirror, which targeting system may be incorporated as part of the original mirror or added as an after-market device.

Still another object of the present invention is to provide a multi-purpose device to help assist in realigning an external mirror as well as provide a warning device for animals to prevent vehicle-animal collisions.

To achieve the foregoing and other objects and in accordance with the purposes of the present invention, as embodied and broadly described herein, a device is provided for use in aligning an exterior mirror of a vehicle to a preestablished position. The device includes an alignment sight securable relative to the mirror to selectively target a fixed member of the vehicle. A mechanism attaches the alignment sight to the mirror, and a device is provided for pivoting the alignment sight in its attached position relative to the mirror in at least two planes. Finally, a mechanism is provided for selectively fixing the pivotal position of the alignment sight relative to the mirror upon targeting the sight to a fixed vehicle member when the mirror is in its preselected position. In one embodiment of the present invention, the alignment sight is adapted to also form a whistle designed to emit sounds at wavelengths audible to animals as air passes therethrough.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 2 is a side schematic of the alignment device illustrated in FIG. 1;

FIG. 3 is a rear schematic of the alignment device illustrated in FIG. 1;

FIG. 4 is an enlarged, exploded view of the components of one embodiment of the present invention;

FIG. 4A is a front elevation view of the alignment sight component illustrated in FIG. 4;

FIG. 5 is an enlarged view of the embodiment illustrated in FIG. 4 with all the components thereof put together;

FIG. 9 is rear schematic of still another embodiment of the present invention secured to an external vehicle mirror;

FIG. 10 is a top schematic of the alignment device illustrated in FIG. 8;

DETAILED DESCRIPTION OF THE PREFERRED EMBODIMENTS

Figure 1:
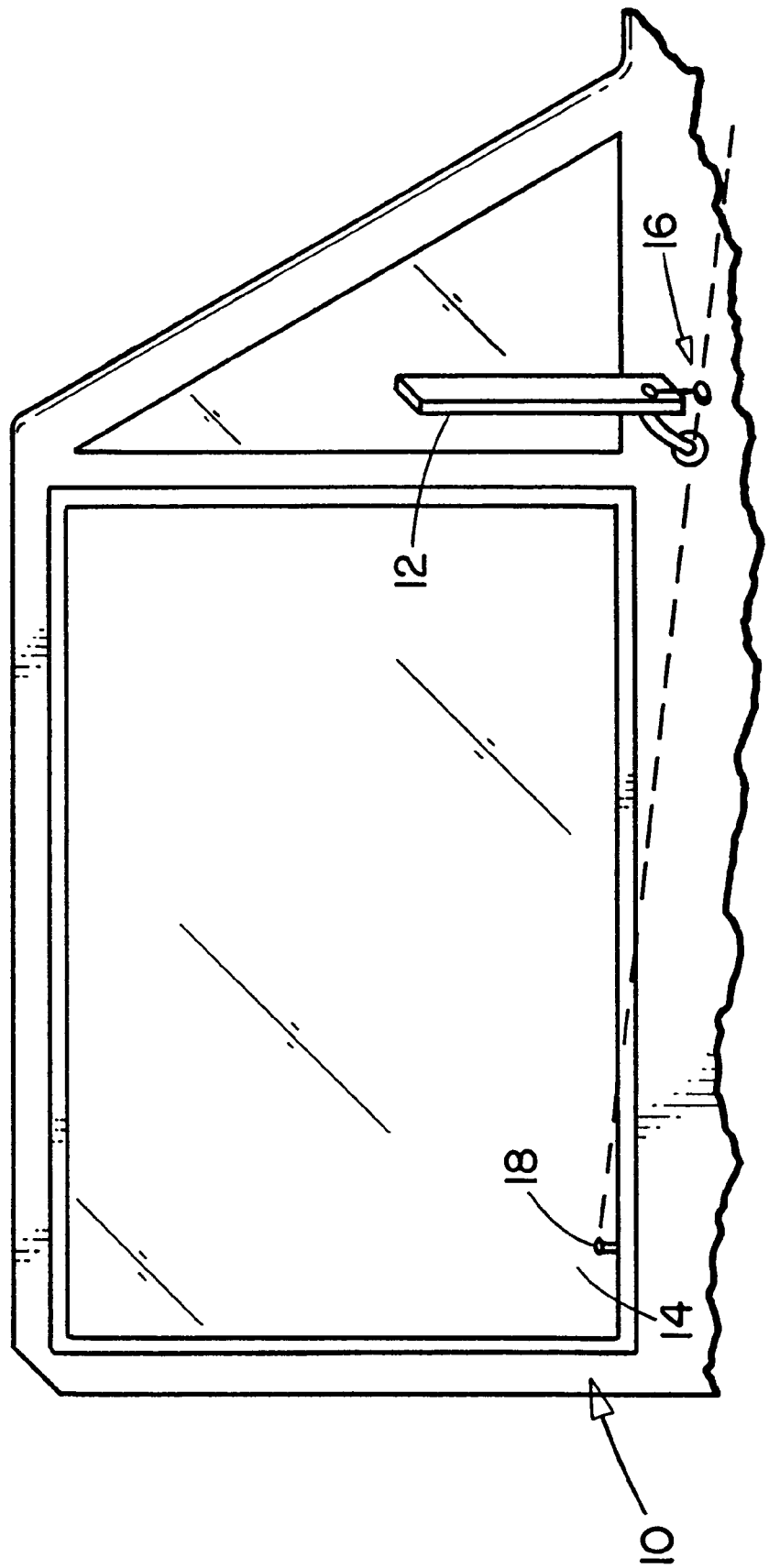
FIG. 1 is a partial side schematic of an automobile illustrating one embodiment of the present invention secured to the rear of an external mirror.

Referring first to FIG. 1, a motor vehicle 10 typically includes an exterior mirror 12 mounted to the side of the vehicle 10 proximate the passenger side 14. The mirror 12 is designed to assist the driver of the vehicle to see both behind the vehicle 10 as well as along side the vehicle 10. Proper positioning of the mirror 12 is important so that the driver can see the "blind spot" along the side portion of the vehicle 10. If the proper position of the mirror 12 relative to a particular driver in the vehicle 10 is accomplished, it is highly desirable to retain that position. Unfortunately, as previously discussed, the mirror 12 is often bumped or jolted so as twist it away from its desired preestablished position for a particular driver. Prior to the present invention, a driver had to get out of the vehicle, come around to the mirror, adjust it, go back into the driver's side and repeat this process several times by trial and error until the proper desired position was once again achieved.

To prevent the aforementioned problem, a mirror realignment device 16 is secured to the mirror 12 and is designed, when in its operational position as illustrated in FIG. 1, to target any selected fixed member on the vehicle 10. By way of example, door lock button 18 is illustrated. However, any fixed member on the vehicle 10, such as a door handle or the like may be utilized with the device 16.

Referring now to FIGS. 2–5, one preferred embodiment of the present invention is illustrated. In this embodiment, a realignment device 16 is mounted to the rear or back portion 20 of the mirror 12 so as not to interfere with the front reflective surface 22. The realignment device 16 includes an alignment sight 24, a mounting plate 26 and an attachment arm 28. The mounting plate 26 is preferably designed to be securely attached to the rear surface 20 of the mirror 12. One end of the arm 28 is secured to the plate 26 as described below, and the opposite distal end of the arm 28 is secured to the alignment sight 24. The alignment arm 28 is of sufficient length so that the sight 24 is positioned below the mirror 22 in its operating position as illustrated in FIGS. 1–3. In this manner, the sight 24 may be directly aligned with a selected fixed vehicle member such as the lock button 18 of the vehicle 10. When the device 16 is not in use, it may be pivoted to its stored position as illustrated by the dotted line of FIG. 2 so that it is out of the way and not extending below the mirror 12 when the vehicle 10 is in operation.

This preferred embodiment of the present invention is more specifically constructed by having a mounting arm 30 secured to the mounting end of the alignment arm 28, The mounting arm 30 is pivotally secured to a pair of brackets 32, 34 which are in turn secured to post 36, 38, respectively, on the mounting plate 26. In this manner, the alignment arm 28 may be pivoted 180° along the back of the mirror 12. A pair of catches 40, 42 are provided on the plate 26 to securely lock the arm 28 in the stored position, and the pair of catches 44, 46 are likewise provided on the opposite end of the plate 26 to securely lock the arm 28 in its operating position.

The alignment sight 24 is secured to the distal end of the arm 28 by a ball joint mechanism. More specifically, a ball 48 is disposed at the distal end of the arm 28. The alignment sight 24 includes a cylinder 50 and a mounting socket 52 which is sized and shaped to receive the ball 48. The ball 48 is fitted within the socket 52 so that the socket 52 may rotated 360° about the ball 48 as well as pivot a few degrees in all directions. In this manner, the cylinder 50 of the sight 24 may be moved in a multitude of directions so as to align it with a desired fixed vehicle member. Once the desired alignment is achieved, as described below, a screw member in the form of a thumb-screw 54 is tightened against the ball 48 within the socket 52 so as to secure the relative positions between the ball 48 and the socket 52. When it is desired to change the alignment of the sight 24, the thumbscrew 54 is loosened thereby allowing free movement of the socket 52 about the ball 48.

The cylinder 50 of the alignment sight 24 includes a pair of fins or dividers 56 and 58 which are aligned substantially perpendicular to each other and extend across the diameter of the cylinder 50. In this manner, the fins 56, 58 form a pair of cross-hairs for targeting a fixed vehicle member. Since there is depth to the fins 56, 58, the targeting becomes even more accurate.

In an alternate embodiment, the cylinder 50 and the fins 56, 58 are sized and shaped so as to create an audible sound as air passes through the length thereof as the result of movement of the vehicle 10. This audible sound is preferably designed so as to be in the wavelengths particularly adapted for animals, such as whistles presently available on automobiles. In this manner, the alignment sight 24 may also dually function as such a deer whistle to prevent animal-vehicle collisions at night. On the other hand, when such a dual function is not desired as in the embodiment illustrated in FIGS. 2–5, a cover 60 by be positioned over the sight 24, arm 28 and mounting member 26 when the device 16 in its closed and stored position. In this manner, debris and other material from the road will not harm the device 16.

Figure 6:
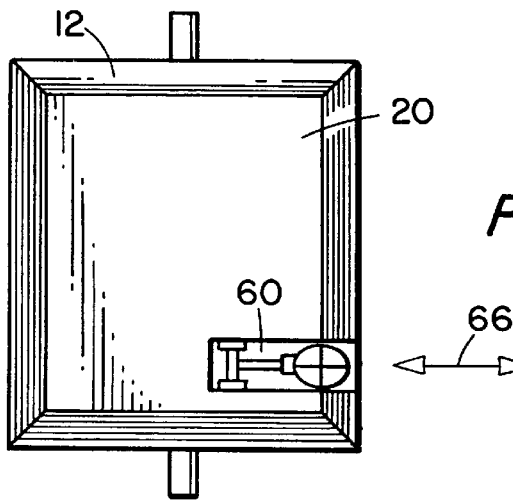
FIG. 6 is a rear schematic of yet another embodiment of the alignment device of the present invention in a stored position.
Figure 7:
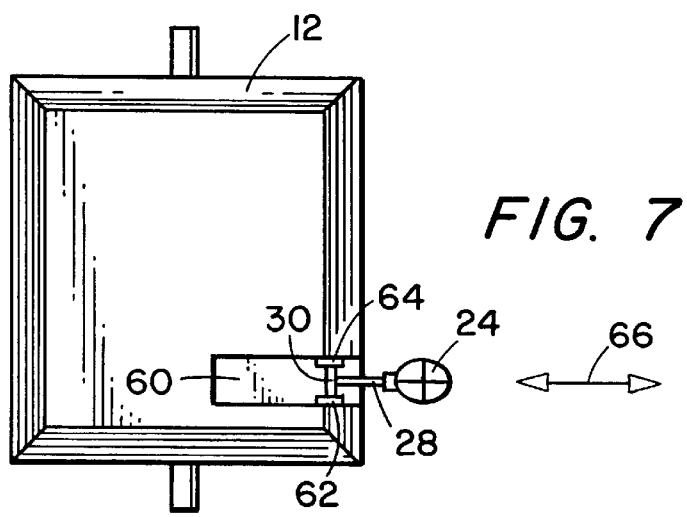
FIG. 7 is a rear schematic similar to that of FIG. 5 but illustrating the alignment device in an operational position.
Figure 8:
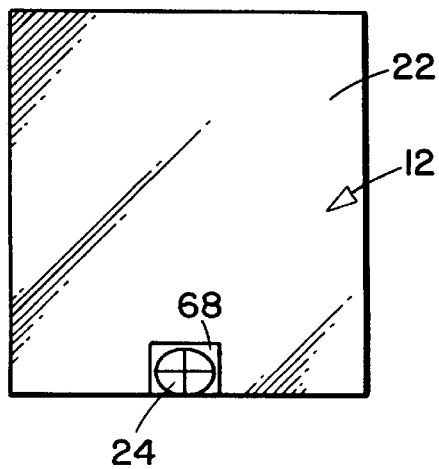
FIG. 8 is a rear schematic of another embodiment of the present invention integrally mounted with external mirror.

FIGS. 6–7 illustrate an alternate mounting arrangement for the embodiment previously discussed. In this particular embodiment, a channel 60 is provided in the rear portion 20 of the mirror 12. As in the previous embodiment, the alignment sight 24 is secured to the distal end of the attachment arm 28. Likewise, the attachment arm 28 is secured to a mounting arm 30. In this instance, however, the mounting arm 30 is firmly secured to a pair of slide brackets 62, 64 instead of gently pivoted to the mounting members 32, 34 of the prior embodiment. The side brackets are 62, 64 are sized and shaped so as to slide along the channel 60 in the directions indicated by the arrow 66. In this manner, if the operational position of the device 16 is desired, the device 16 is moved outwardly along the channel 60 until it projects outward from the perimeter of the mirror 12. Once the alignment sight has been targeted to the appropriate fixed vehicle member and locked in position, the device 16 may be moved into its closed or stored position by simply sliding the brackets 62, 64 along the channel 60 until the alignment sight 24 is pulled within the channel 60 as illustrated in FIG. 6. All the other portions of the device 16 in terms of adjusting the alignment of the sight 24 is the same as in the previous embodiment.

Yet another embodiment of the present invention includes the permanent mounting of the alignment sight 24 within a mirror 12. In this particular embodiment, a notch 68 is provided within the mirror 12, and the sight 24 is positioned therewithin. The notch 68 passes entirely through the mirror 12 so that the fins of the cylinder 50 of the alignment sight 24 are exposed to the environment at both ends. In this manner, the sight 24 may function in a dual capacity as an animal warning whistle previously discussed. The notch 68 may be positioned anywhere along the mirror 12, although it is preferably positioned along the center lower edge of the mirror 12 which would tend to minimize the impact on the reflective surface 22 of the mirror 12.

While the previously preferred embodiment illustrated in FIGS. 1–5 disclose a preferred form of mounting the device 16 to the mirror 12, other mechanisms may be used to mount the device 16 to the mirror 12. Referring, by way of example, to FIGS. 9–10, a pair of metal looks 70, 72 are provided. Each hook 70, 72 includes a base member 74, 76, respectively, for securing to the edges 78, 80 of the mirror 12. In addition, each hook 70, 72 includes a ledge 82, 84, respectively, for hooking about the front 22 of the mirror 12. The hooks 70, 72 are then secured to each other along the rear mirror potion 20 by a strap 86 which includes a tightening mechanism 88 of any desired design. In this embodiment, then, the alignment sight 24 and the attachment arm 28 are secured to the hook 70 along the base member 74. The attachment arm 28 is securely fixed to the base member 74, and the distal end of the attachment arm 28 is secured to the alignment sight 24 in the same manner as previously described. In this manner, the alignment sight 24 will project outwardly from one side edge 78 of the mirror 12, and will continuously be in an operational position. This particular embodiment is especially applicable to the combination device wherein the alignment sight 24 may also act as an animal warning whistle previously described.

Figure 13:
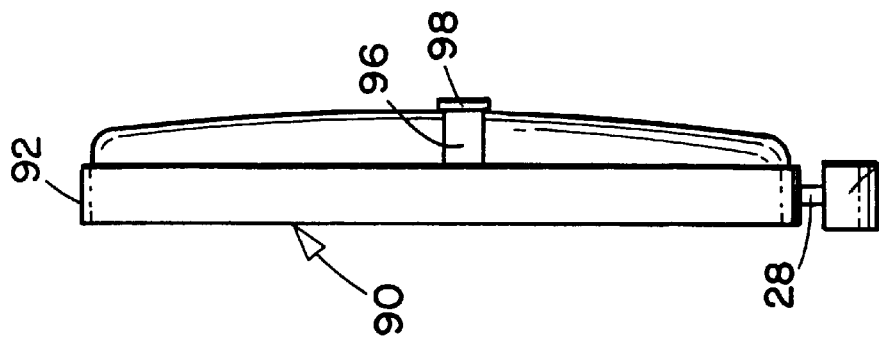
FIG. 13 is a side schematic view of the device illustrated in FIG. 11 mounted to an external vehicle mirror.
Figure 12:
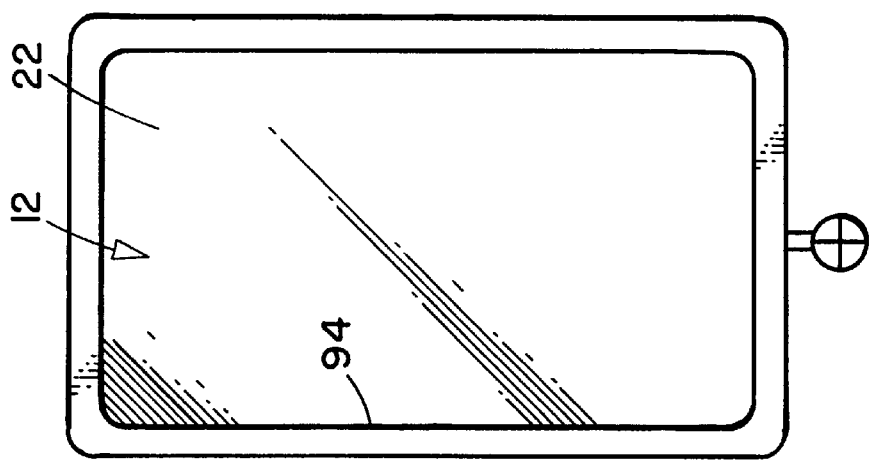
FIG. 12 is a front perspective view of the alignment device illustrated in FIG. 10 mounted to the exterior mirror.
Figure 11:
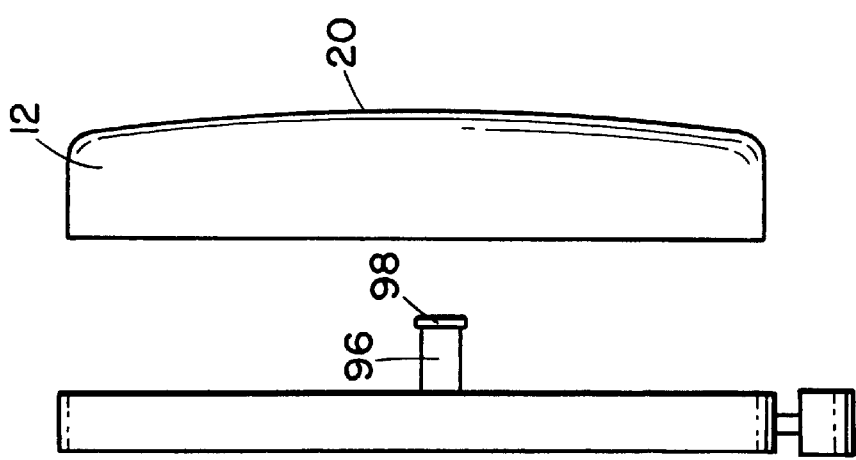
FIG. 11 is a side schematic of still another embodiment of the alignment device of the present invention in relation to an exterior mirror.

Yet another manner of securing the alignment sight 24 to the mirror 12 is illustrated in FIGS. 11–13. This particular embodiment is similar to the embodiment illustrated in FIGS. 9–10 in that that the alignment sight 24 is continuously in an operational position thereby readily functioning, if it is so desired, in the dual mode as the alignment sight as well as an animal warring whistle. In this particular embodiment, a frame member 90 is sized and shaped to fit about the entire periphery of the mirror 12 at the front portion of the mirror 12. In preferred form, the frame 90 includes an outer peripheral band member 92 for surrounding the periphery of the mirror 12, and a lip 94 that extends inwardly from the outer band 92 so as to cover the outer edge of the front surface 22 of the mirror 12. In this manner, the frame 90 snugly fits about a mirror 12 by positioning it from the front of the mirror 12. A strap 96, or any other type of securing mechanism is provided along the back portion 20 of the mirror 12 so as to securely hold the fame 90 in place. An adjustment mechanism 98 is provided for securely snuggling the strap 96 about the back 20 of the mirror 12 so as to hold the frame 90 in place. In this embodiment, the target sight 24 is secured by an attachment arm 28 to the bottom portion of the frame 90 in a manner previously described. In this manner, the alignment sight 24, as in the embodiment illustrated in FIGS. 9–10, projects outwardly from the outer periphery of the mirror 12 without interfering with the front visual surface 22.

Figure 14:
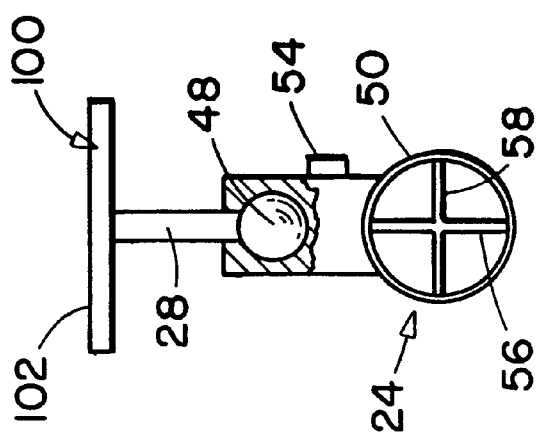
FIG. 14 is a side schematic view of yet another embodiment for mounting the device of the present invention.
Figure 15:
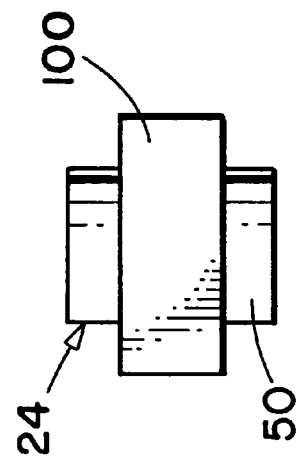
FIG. 15 is a top schematic view of the device illustrated in FIG. 14.
Figure 16:
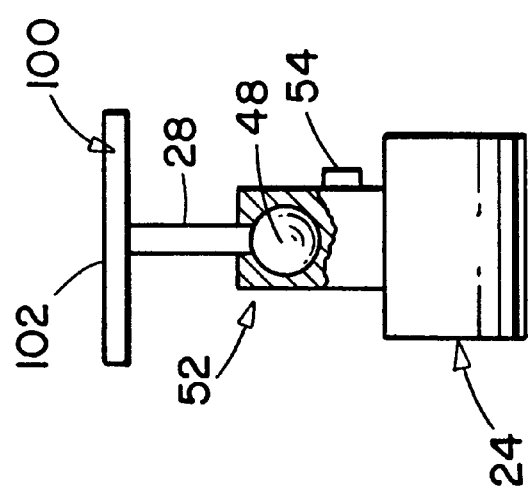
FIG. 16 is a front schematic view of the device illustrated in FIG. 14.

A further embodiment illustrating yet another alternate manner of attaching the alignment sight 24 to the mirror 12 is illustrated in FIGS. 14–16. In this embodiment, the attachment arm 28 is secured to a mounting plate 100. The mounting plate 100 is designed to be secured to an edge of the mirror 12 to project the sight 24 beyond the mirror's perimeter. While the plate 100 may be secured in any manner, it preferably has a self-sticking surface 102 which adheres firmly to the mirror.

To operate the alignment sight 16 of the present invention, once the mirror 12 has been set at a preestablished position, the device 16 is moved into its operational position if it is one of the embodiments that is capable of moving from a stored to an operational position. Once the device 16 is in its operational position, the thumbscrew 54 is loosened to enable free movement of the sight cylinder 50. The sight cylinder 50 is then moved until the fins 56, 58 are lined up with a fixed vehicle member such as the door lock button 18 of FIG. 1. Once this alignment is accomplished, the thumbscrew 54 is tightened so as fix the position of the cylinder 50 and the socket 52 relative to the ball 48 and the alignment arm 28. Once the thumbscrew 54 fixes this aligned position, the alignment sight 24 is no longer capable of being moved relative to the attachment arm 28. If the device 16 is one of the embodiments that is capable of being moved between an operational and a stored position, the attachment arm 28 and alignment sight 24 are then moved to the stored position. This alignment of the sight 24 is, of course, only performed when the mirror 12 is in the desired operational position for the vehicle driver. Should the mirror 12 subsequently become bumped or jolted from its desired preestablished position, a vehicle operator simply gets out of his vehicle, moves to the passenger side of the car, moves the device 16 to its operational position, and then realigns the fixed alignment sight 24 along with the attached mirror 12 with the fixed vehicle member 18. Once the alignment sight 24 is realigned with the fixed vehicle member 18, the mirror 12 is back in its pre-establish desired position. The device in 16 is then returned to its stored position, if this feature is available, and realignment of the mirror 12 has been accomplished. In the embodiments wherein the alignment sight 24 is constantly exposed to air passing therethrough due to the forward movement of the vehicle 10, the dual function of alignment sight and animal whistle may be utilized.

As can be seen from the above, the present invention provides a simple and efficient means for enabling an operator of a vehicle to easily realign the external mirrors of his vehicle, and particularly the passenger side mirror, should such mirrors become moved out of alignment. Moreover, if the mirror has been adjusted for another driver, the original driver can simply readjust it to the preestablished position by use of the present device. The device of the present invention does not require 3-way mirror systems which add to the possible error as well as complexity and expense of the device. Moreover, the present invention also provides a dual function wherein the alignment device, when not being used as an alignment device, may be also used as an animal warning whistle. In this manner, the device of the present invention will be consistently serving a useful function rather than being a device only useful in case the external mirror has been misaligned. Since the device of the present invention may be made out of plastic or other inexpensive material, it is inexpensive to manufacture and use as well as simple to operate. It may be used in the form of an after market device, or it may be incorporated into the external mirror of the vehicle at the time the vehicle is manufactured. In either event, the device of the present invention provides a simple and inexpensive means for quickly realigning external mirrors without requiring complex remote control devices sometimes available in present vehicles. Moreover, on truck mirrors, such remote control devices are not available. The device of the present invention, however, is available for all types and sizes of mirrors.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A device for use in aligning an exterior mirror of a vehicle to a preestablished mirror position, said device comprising:

an alignment sight securable relative to said mirror to selectively target a fixed member of the vehicle extrinsic to said mirror;

means for attaching said alignment sight to said mirror;

means for pivoting said alignment sight in its attached position relative to said mirror in at least two planes; and means for selectively fixing the pivotal position of said alignment sight relative to said mirror upon targeting said sight to said fixed vehicle member at said preestablished mirror position, said exterior mirror being realignable to said preestablished mirror position by adjustment of the mirror position to re-target said alignment sight in its fixed position to the selected fixed vehicle member.

2. The device as claimed in claim 1, wherein said attachment means includes means for moving said alignment sight between a first operating position disposed outside the perimeter of the exterior mirror to permit targeting of a fixed vehicle member extrinsic to said mirror and a second stored position which does not block the mirrored surface of said exterior mirror.

3. The device as claimed in claim 2, wherein the second stored position of said alignment sight is at the rear surface of the mirror.

4. The device as claimed in claim 3, wherein said attachment means comprises an attachment arm having a mounting end and a distal end with said attachment arm distal end carrying said alignment sight, said attachment means further including means for securing said attachment arm mounting end to the rear portion of said mirror to permit movement of said alignment sight and attachment arm between said operating position and said stored position.

5. The device as claimed in claim 4, wherein said attachment means further includes an attachment plate secured to the rear portion of said mirror, said attachment arm mounting end being pivotally secured to said attachment plate, said attachment arm being of sufficient length to project said alignment sight beyond the perimeter of said mirror when said arm and said sight are in said operating position, and to pivot said sight about said attachment plate to move said sight into its stored position behind said mirror.

6. The device as claimed in claim 5, wherein said attachment means further includes means for releasably securing said attachment arm in its stored position wherein said arm is disposed proximate the rear surface of said exterior mirror.

7. The device as claimed in claim 4, wherein said attachment means further includes a slide channel disposed in the rear portion of said mirror, said channel being sized and shaped to receive said attachment arm alignment sight, and means for moving said attachment arm mounting end lengthwise along said channel to move said sight into said channel for said stored position and out of said channel projecting beyond the perimeter of said mirror for said operating position.

8. The device as claimed in claim 1, wherein said attachment means comprises a frame member disposed about the perimeter of said exterior mirror, said sight being secured to said frame and projecting outwardly from the periphery of said mirror.

9. The device as claimed in claim 1, wherein said attachment means comprises an adjustable clamp disposed across the rear surface of said exterior mirror, said alignment sight being secured to said clamp and projecting outwardly from the periphery of said mirror.

10. The device as claimed in claim 1, wherein said attachment means comprises a notch disposed along the outer edge of said mirror sized and shaped to incorporate said alignment sight therein as an integral component of said mirror.

11. The device as claimed in claim 1, wherein said pivot means comprises a ball joint wherein said sight rotates 360° in one plane and pivots at least a few degrees in all directions.

12. The device as claimed in claim 11, wherein said ball joint comprises a ball disposed in a socket, and wherein said means for selectively fixing the pivotal position of said alignment sight comprises a screw member disposed for selective tightening in said socket against said ball to fix the position of said sight relative to said attachment means.

13. The device as claimed in claim 1, wherein said position fixing means comprises a screw member adapted to selectively tighten against said pivot means to maintain said alignment sight in a preselected targeting position relative to said mirror.

14. The device as claimed in claim 1, wherein said alignment sight comprises a tubular member having at least two fins arranged crosswise to each other therewithin to form cross-hair sighting members for targeting the fixed vehicle member as well as to form a whistle designed to emit sounds at wave lengths audible to animals as air passes through said tubular member.

15. The device as claimed in claim 1, wherein said attachment means comprises a self-sticking plate for attachment to said mirror.

16. A device for realigning a vehicle exterior mirror to a pre-established position, said device comprising:

an alignment sight mountable to the mirror to selectively target a fixed member of the vehicle extrinsic to said mirror;

mounting means for securing said alignment sight to the mirror for movement between an operating position for targeting the fixed vehicle member and a stored position behind the rear surface of the mirror to prevent the blocking of the mirrored surface of the mirror;

means for rotating and pivoting said alignment sight relative to said mounting means in at least two planes to enable adjustment of said alignment sight in its operating position to an orientation for targeting the fixed vehicle member; and means for securely stabilizing said alignment sight in a selected targeting position relative to said mounting means and the mirror.

17. The device as claimed in claim 16, wherein said alignment sight is sized and shaped to form a whistle designed to emit sounds at wave lengths audible to animals as air passes therethrough.

18. The device as claimed in claim 16, wherein said mounting means comprises an attachment arm having a distal end secured to said alignment sight and an attachment end for movably mounting said arm to the rear portion of the mirror for moving said alignment sight and attachment arm between said operating position and said stored position.

19. The device as claimed in claim 18, wherein said mounting means further comprises an attachment plate mounted to the rear surface of the mirror and designed for pivotally securing the attachment end of said attachment arm thereto for movement of said alignment sight between said operating and said stored positions, said attachment arm being of sufficient length to project said alignment sight beyond the outer circumference of said mirror to its operating position.

20. The device as claimed in claim 18, wherein said mounting means further comprises a channel disposed in the rear portion of the mirror and means for slidingly securing the attachment end of said attachment arm for movement along said channel to move said alignment sight between its stored position within said channel and its operating position projecting outside the perimeter of the mirror.

21. The device as claimed in claim 16, wherein said rotating and pivoting means comprises a pivot joint disposed at the distal of said attachment arm for securing said alignment sight to permit said alignment sight to rotate 360° in at least one plane and to pivot at least a few degrees in all directions.

22. The device as claimed in claim 21, wherein said pivot joint comprises a ball member disposed at the distal end of said attachment arm and a socket disposed at one end of said alignment sight journaled over said attachment arm ball member, and wherein said stabilizing means comprises a threadable tightening member disposed in said socket to selectively permit movement between said ball and socket or to stabilize said socket relative to said ball.

* * * * *